W. BARROTT.
TREE PROTECTOR.
APPLICATION FILED JULY 8, 1913.
1,081,482.
Patented Dec. 16, 1913.
2 SHEETS—SHEET 1.
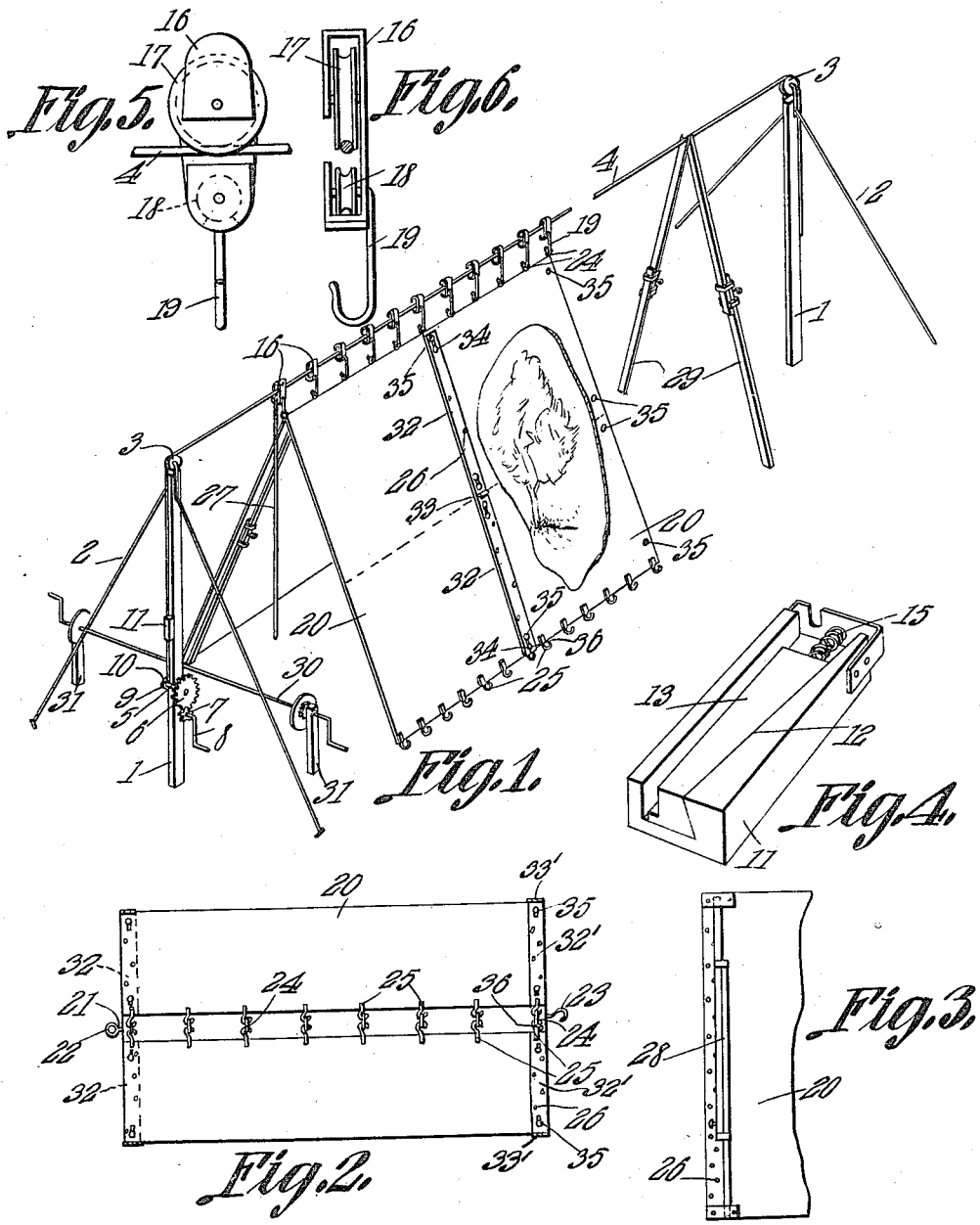
Witnesses
William Barrott, Inventor
by C. A. Snow & Co., Attorneys

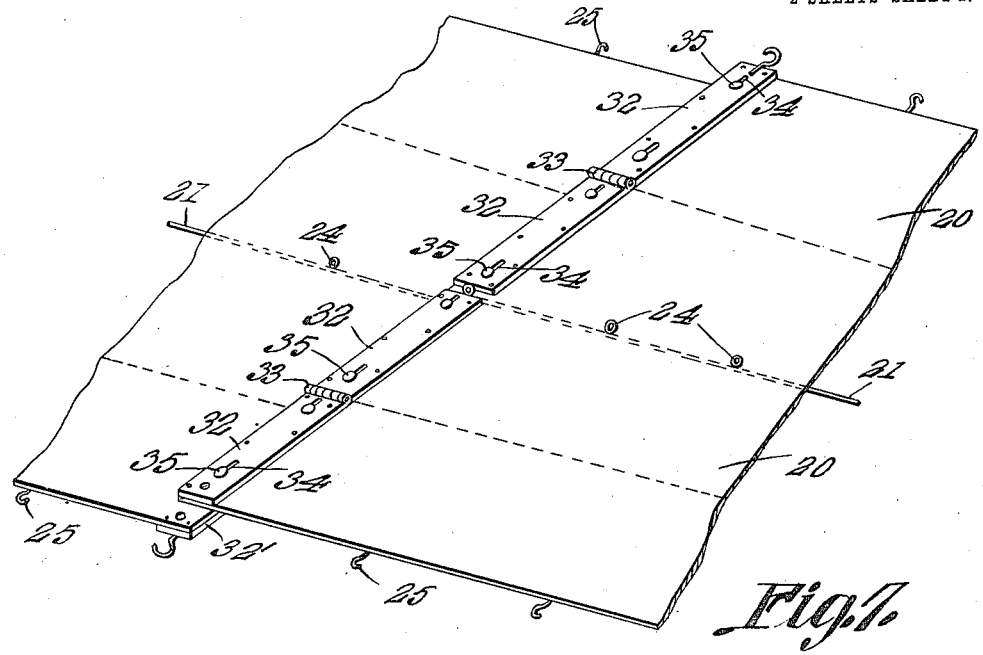
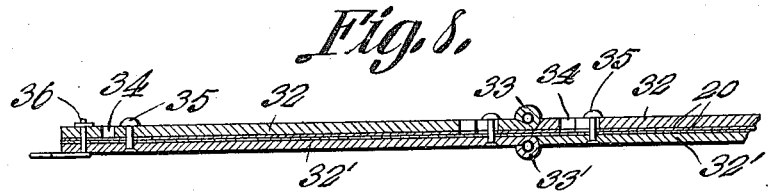
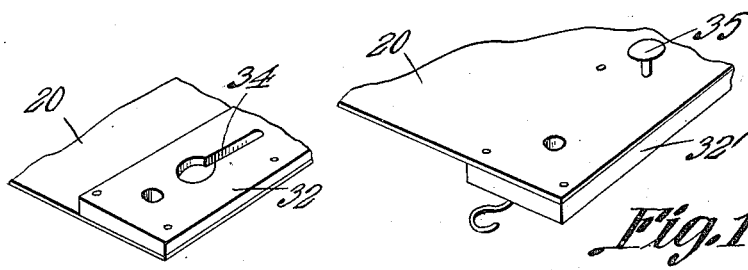
William Barrott, Inventor

UNITED STATES PATENT OFFICE.

WILLIAM BARROTT, OF MANHATTAN BEACH, CALIFORNIA.

TREE-PROTECTOR.

1,081,482.  Specification of Letters Patent.  Patented Dec. 16, 1913.

Application filed July 8, 1913. Serial No. 777,921.

*To all whom it may concern:*

Be it known that I, WILLIAM BARROTT, a citizen of the United States, residing at Manhattan Beach, in the county of Los Angeles and State of California, have invented a new and useful Tree-Protector, of which the following is a specification.

The present invention appertains to tree protectors or covers, and aims to provide a novel and improved device for shielding fruit trees and other vegetation against frost, hail, winds, etc., and for permitting trees or other vegetation to be fumigated.

The present invention also comprehends the provision of an apparatus of the character indicated which may be readily extended over the trees or vegetation, and which may be readily and compactly folded or collapsed when not in use.

With the foregoing and other objects in view, which will be apparent as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawings, wherein—

Figure 1 is a perspective view of the apparatus, parts being broken away. Fig. 2 is a plan view of one of the canopy sections in folded condition. Fig. 3 is a fragmental detail of one of the canopy sections. Fig. 4 is a clamp for the canopy-supporting cable. Fig. 5 is a side elevation of one of the pulley blocks. Fig. 6 is an edge elevation of the block illustrated in Fig. 5. Fig. 7 is a perspective view of the adjoining portions of two canopy sections illustrating the attaching means. Fig. 8 is a sectional detail taken along the joint between the canopy sections. Fig. 9 is a fragmental perspective of a detail, and Fig. 10 is a similar view of another detail.

In carrying out the invention, reference being had in detail to the drawing, a post or upright 1 is driven into or supported by the soil at each end of the row of trees or other vegetation, the posts being supported in erect position by means of guys 2. Pulleys 3 are carried by the upper ends of the posts 1, and a cable 4 is trained over the pulleys 3 and has one end secured to one of the posts 1, while the other end is connected to a winch or windlass carried by the other post. This windlass embodies a drum 5 carrying a spur gear 6 at one end, a spur gear 7 meshing with the gear 6 and having a crank 8 engaged thereto for manually operating the drum. The drum 5 also carries a ratchet wheel 9 at its other end, which coöperates with a pawl or dog 10 to prevent the retrograde movement of the drum when being wound up.

The post 1 to which the windlass is attached, also carries a clamp for the cable 4, which embodies a block 11 having a channel in one side, one edge of the channel being inclined as at 12. A wedge block 13 is disposed within the channel of the block 11, and is provided with an inclined face coöperating with the inclined edge 12 of the channel, so that the cable may be clamped between the other edge of the channel and the wedge or clamping block 13. The wedge or clamping block 13 is preferably pressed into engagement with the cable by means of the coiled wire spring 15 so that the cable may be locked in position.

A plurality of pulley or sheave blocks 16 are mounted on the cable 4 between the posts 1, each of the blocks having the pulley or sheave 17 engaging the cable 4 and a supplemental pulley or sheave 18 below the cable. Each of the pulley blocks 16 also carries the depending hook 19.

The canopy or cover proper embodies a plurality of sections 20 constructed of suitable fabric, which is water proof as well as wind proof. Each of the sections 20 embody two sides connected at their upper ends and having a flexible rope or cable 21 secured within the seam or within the ridge of the sides of the section. One end of the cable 21 is provided with an eye 22, while the other end is provided with a hook 23, the hooks and eyes of the respective cables 21 being adapted to interlock so as to connect the sections 20 together, as will hereinafter appear. A plurality of eyes 24 are also attached to the ridge of each section 20, or to the respective cable 21, and are designed for the engagement of the hooks 19 of the pulley blocks. The respective edges of the sections are adapted to be attached by means of securing or coupling members 26 carried by the edge portions of the sections, the edges of the sides being adapted to overlap so that all of the sections may be united to provide a continuous canopy or tent standing over the row of trees or other vegetation. A plurality of hooks 25 are attached to the lower ends of the respective sides of the various sections 20, the sides being adapted to be folded back in order that the hooks 25 may be engaged with the eyes 24 when the canopy is to be folded or rolled up. A hoisting cable 27 is also provided, the same being adapted to be trained over the various supplemental pulleys 18 in order to permit the canopy sections to be raised or elevated when the canopy is to be extended over the tree.

Extension braces 28 are detachably carried by the inner faces of the sides of the canopy sections 20, the braces being adapted to be inserted when the canopy is erected, and being adapted to be removed when the canopy sections are to be folded and rolled up. The ends of the braces 28 are preferably received in pockets provided in the canopy section 20, so that they may be readily inserted and removed.

Similar extension members 29 may be employed for propping the cable 4 at suitable points along its length in order to prevent the cable from sagging at such points.

A relatively wide drum 30 is supported adjoining the post 1 carrying the windlass, the said drum being supported by means of stakes 31 driven into the soil. It is upon the drum 30, that the canopy is adapted to be rolled when not in use.

The attaching means 26 for the edges of the respective canopy sections embody the following essentials.

To the adjoining edge portions of the respective canopy sections are attached the respective straps or leaves 32 and 32'. Two pairs of straps or leaves are provided for each side of each canopy section, the respective straps 32 and 32' being hinged at their adjoining ends as at 33 and 33'. The straps 32 are preferably secured on the outer faces of the respective canopy sections, while the straps 32' are preferably secured to the inner faces of the respective canopy sections. The straps or leaves 32 are provided with key-hole openings 34, which extend in the same direction, as seen in Fig. 7. The straps or leaves 32' are provided with the headed studs 35 which are engageable through the key-hole openings 34 when the respective edges of the canopy sections overlap.

In attaching the respective canopy sections together, the sections are preferably laid flat, as illustrated in Fig. 7, so that the headed studs 35 may be engaged through the key-hole openings 34 as seen in the said figure. The key-hole openings and headed studs are so disposed that when the studs 35 are inserted through the heads of the key-hole openings, the canopy sections will be slightly out of alinement, so that when the canopy sections are brought into alinement, the studs 35 will engage the tails of the key-hole openings 34, thereby locking the respective sets of straps 32 and 32' together, and consequently attaching the canopy sections. A tight joint is thus attained between the respective canopy sections, and it will be observed that the respective pairs of hinged straps being attached will serve to brace the respective sides of the canopy. If desired, the respective straps may be secured together by bolts 36 to prevent the straps from sliding out of engagement.

The hinges 33 and 33' of the respective straps are disposed midway, or approximately so, between the upper and lower ends of the sides of the canopy sections, in order that when the canopy sections are detached, the ends of the canopy sections may be folded back, as seen in Fig. 2. It will be observed that the ends of the canopy sections cannot be folded back until the sections are detached.

In use, when the canopy is extended, it will be noted that the hooks 19 may be engaged with the eyes 24 so as to sustain or support the canopy over the trees or other vegetation, and if desired, the hooks 25 may be employed for anchoring the sides of the canopy sections to the soil. The ends of the canopy may be closed in any convenient manner. When the canopy is thus suspended, it will be noted that the trees or other vegetation will be shielded or protected against exposure to frost, hail, wind and the like, and the canopy will also permit the trees or vegetation to be fumigated, as will be understood.

When the canopy is to be taken down, the respective sections thereof are first detached from each other, the sections also being released from the soil, to which they are anchored. The respective canopy sections are then drawn along the cable 4 toward the drum 30 and by detaching the eyes 24 from the hooks 19, of the pulley blocks, the canopy sections may be lowered. The braces 28 are removed, so as to permit the ends of the canopy sections to be folded back, the hooks 25 being engaged through the eyes 24, as seen in Fig. 2, to lock the canopy sections in folded condition. The respective hooks and eyes of the cables 21 of the canopy sections are then engaged with each other, so that the canopy sections may be wound upon the drum 30 in a convenient manner. It will be noted that the cables 21 are flexible so as to wind readily upon the drum 30, the straps 32 and 32' also being wound upon the drum with the canopy sections. Conversely, the canopy sections may be readily erected, the hoisting cable 27 being employed for raising the canopy sections in order that the eyes 24 may be engaged with the hooks 19 of the pulley blocks, as will be apparent, it being understood, of course, that the cable 27 may also be employed for lowering the canopy sections when the canopy is collapsed.

Having thus described the invention, what is claimed as new is:—

1. In a device of the character described, a supporting cable, a plurality of members carried thereby to move therealong, a plurality of canopy sections, members attached to the ridges of the canopy sections and engageable with the first mentioned members, means for detachably connecting the canopy sections together, the ends of the canopy sections being adapted to be folded back, and members carried by the free portions of the canopy sections and engageable with the second mentioned members.

2. In a device of the character described, a supporting cable, pulley blocks engaging the cable, hooks carried by the pulley blocks, a plurality of canopy sections, means for securing the adjoining edges of the canopy sections together, eyes attached to the ridges of the canopy sections and engageable by the said hooks, the ends of the canopy sections being adapted to be folded back, and hooks secured to the ends of the canopy sections engageable with the aforesaid eyes.

3. In a device of the character described, posts, a cable carried thereby, a plurality of canopy sections, hinged straps secured to the adjoining edges of the canopy sections, means for attaching the respective straps together, and means for supporting the canopy sections from the cable.

4. In a device of the character described, a supporting cable, a plurality of canopy sections, hinged straps secured to the respective edges of the canopy sections, certain of the straps having key-hole openings and the others having studs to engage through the key-hole openings for attaching the respective edges of the canopy sections together, and means for detachably supporting the canopy sections from the cable.

In testimony that I claim the foregoing as my own, I have hereto affixed my signature in the presence of two witnesses.

WILLIAM BARROTT.

Witnesses:
A. C. CONNER,
EBEL HORNER.

Copies of this patent may be obtained for five cents each, by addressing the "Commissioner of Patents, Washington, D. C."